Patented Feb. 14, 1928.

1,659,197

UNITED STATES PATENT OFFICE.

ANNA ESTELLE GLANCY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC LENS.

Application filed February 2, 1925. Serial No. 6,309.

This invention relates to new and useful improvements in ophthalmic lenses, and has particular reference to a corrected prismatic lens and to a process for the production of the same.

A most important object of the invention is to produce a prismatic lens which shall be corrected for spherical and astigmatic error.

A second object of the invention is to produce a prismatic ophthalmic lens which shall have the prism desired, and whose geometrical center shall not differ in power from the prescribed power as is usually customary in prismatic lenses produced by decentration.

Another object of the invention is to provide a blank from which can be cut prismatic ophthalmic lenses, the said blank having a center power corrected to produce a minimum amount of error at a decentered point, which is to be the geometrical center of the finished lens.

Still another object of the invention is to provide a process whereby a blank may be formed for a prismatic ophthalmic lens having a prism of any given power, and which will give the most efficient vision for a prismatic lens of that power.

Other objects and advantages of my invention will become apparent during the course of the following description taken in connection with the accompanying drawing.

In the drawing, wherein for the purpose of illustration I have shown the preferred embodiment of my invention, and in which like numerals designate corresponding parts throughout all views of the same:

Figure 1:
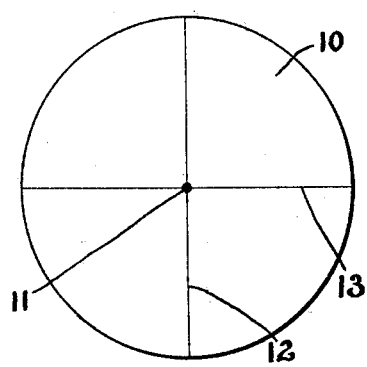
Figure 1 is a front elevation of a lens blank used in my process.

In so far as I am aware, there are at the present time two general processes for the production of prismatic ophthalmic lenses, namely, grinding by hand and decentration.

In the first process, that of grinding by hand, it is necessary for the operator to take a lens, ground to power, and by constantly increasing the pressure as he draws the same over a grind-stone, grind therein a prism of the desired power. It is obvious that it requires considerable skill to produce the prism of the power desired and to keep the power of the lens at the desired degree at all the points. In addition, this process is not only tedious, but requires considerable time when prisms of any great power must be ground.

The second process, that of decentration, depends for its basis upon the rule that any lens is capable of producing as many prism diopters as the lens possesses diopters of refraction, provided it is decentered 1 centimeter. To this rule there may be added that the prism diopters will increase or decrease proportionally as the decentration becomes greater or less. From this it may easily be seen that a prism of practically any power may be produced in a lens of any power, provided there is sufficient room for the necessary decentration.

As a few examples, it may be seen that a lens of one diopter if decentered one centimeter would give a prism of one prism diopter; a lens of two diopters decentered one centimeter would give two prism diopters, and so on, the prism diopter being the unit prismatic refraction, and being equal to a deflection of one centimeter at a distance of one meter from the lens.

It is obvious that the production of prismatic lenses by decentration is by far the more expedient and simple process of the two, although it too has certain drawbacks which have prevented it from becoming the exclusive process. It is a well known fact to those skilled in the art of ophthalmic lens manufacture that as we depart from the optical center of an ophthalmic lens the power of the lens changes owing to the obliquity of the rays and to the prism angle of the lens. While a lens may be ground to some one definite power at its center, a measurement of the powers in any two planes at any point off the center of the lens will show a variation from this central power dependent upon the distance of this point from the optical center, the shape of the lens, the power of the lens, the index of refraction of the glass used, the center thickness of the lens, and the direction from which light enters the lens. From this it may readily be seen that if we produce a prismatic lens by decentration that although we may grind our blank to the power which we desire at its optical center when we decenter and cut our finished prismatic lens about a new center, we obtain as the geometrical center of our finished lens, a point which differs in power from the power which we desire. In other words, we will obtain a lens whose geometrical center varies from the power of the optical center of our lens and, therefore, from the power which we originally desired to obtain.

It becomes, therefore, a most important object of my invention to provide a process whereby we may produce a prismaitc lens whose geometrical center has the power which we desire. I accomplish my process by a series of six steps, which I have diagrammatically shown in the drawing, each figure thereof representing a successive step in the process.

Referring now particularly to Figure 1, and tracing first the process through in a general manner, I have shown a lens blank 10, in which I have located the focal center 11. Through this focal center 11, I may imagine the two meridians 12 and 13. For the sake of clearness in this description I will consider the blank for this general process as spherical, although my process may be applied to a lens of any shape desired.

Figure 2:
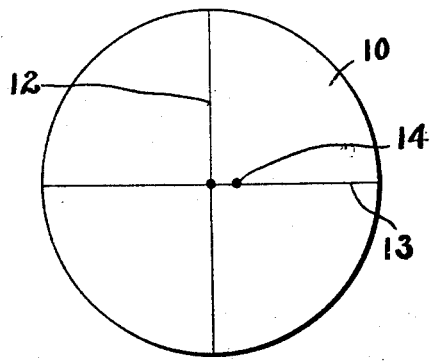
Figure 2 is a similar view showing the second step in the process.

Having been given some definite power which I desire to obtain in my completed lens, and also some definite amount of prism diopter, I locate, as shown in Figure 2, the point 14 which is to become the geometrical center of my finished prismatic lens, and whose position is determined by the amount of decentration necessary to produce the prism diopter desired, and by the relative position in which I want the base of my prism to lie. Although I have shown it in this instance to be on the horizontal meridian, it is obvious that should I desire my prism to be base up or base down the point 14 would be located on the vertical meridian either above or below the center line.

Figure 3:
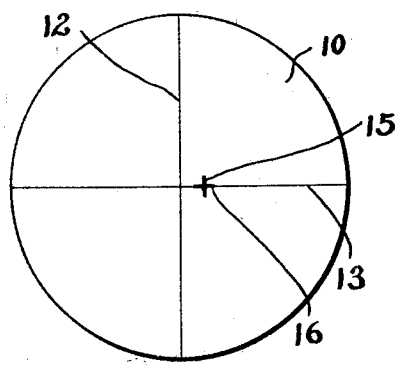
Figure 3 is a similar view showing the third step in my process and the location of the center of the new lens.

Having thus computed the location of the point 14, I proceed by well known trigonometrical calculations, to compute for this point its amount of departure from the axial power. I preferably compute these quantities in two planes, as shown in Figure 3, one plane being represented by the line 15, called the secondary plane, and the other plane by the line 16, called the primary plane. Having obtained the departure, then, of this point from the axial power of the blank, I proceed, as in Figure 4, to compensate for these errors by adding the inverse of these quantities to the axial power of the blank. For example, should I find by calculation that the power at the point 14 in the plane designated by the line 15 is too great by one half a diopter, I should require a lens blank at whose optical center along the line shown at 17 in Figure 4, the power is reduced by an amount equal to this, or, one half a diopter, and similarly in the plane designated as 16 in Figure 3, should the error in this be, we will say, minus one half a diopter, I should require a greater power in my lens blank at its optical center in the plane designated by the numeral 18 in Figure 4, by one half a diopter. By so modifying the power of the blank, at its optical center, the errors at the point 14 which occur in the opthalmic use of the lens are compensated.

Figure 5:
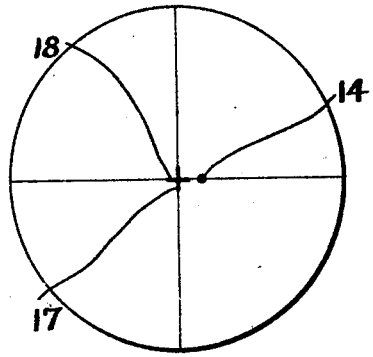
Figure 5 is a front elevation of a lens blank when the same has been ground to size, and illustrating the fifth step of my process.

Having thus found by calculation the powers which I must form on my lens at its optical center, I grind my blank, as shown in Figure 5, to the new corrected power. In this way it will be seen that by producing a blank with a substantially incorrect optical center, I obtain at the selected point designated by the numeral 14, those powers which I originally desired to obtain in my finished lens.

Figure 6:
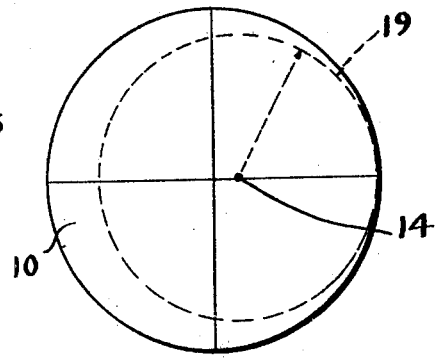
Figure 6 shows the completed blank from which the prismatic lens is to be cut.

In Figure 6, I have shown the last and final step in my process, which consists in cutting about the point 14 a completed lens 19, which shall have the prism diopter and refractive diopter desired. In order now to more clearly show my process as applied to a specific example, I will trace the same through the diagrammatic representation in the drawings when applied to a specific prescription.

Let us consider that we have been given a prescription calling for a lens for the right eye, having the power $+7D$ sphere, 8.75 prism base out, the same to be ground with a rear surface of $-4.00D$, a center thickness of 4.2 mm., and of a glass whose index of refraction equals 1.523. From this information, we are able to compute by mathematical means, that curve, which placed on the front surface of the blank will give a lens of $+7D$ sphere. The power of the curve to be placed on the front surface of the blank, is computed from the power of the curve of the rear surface of the blank, the center thickness desired in the finished lens, and the index of refraction of the glass, and happens to be in this particular case $+10.67D$.

Having thus determined the power of the curve to be placed on the front surface of my lens blank in order to give me a lens of $+7D$ sphere, I proceed to consider how I am to include in my finished lens a prism of 8.75 base out. Since I am to obtain this prism by cutting my finished lens about a decentered point as a geometrical center, I proceed to locate this point which is to be the geometrical center of my finished lens, the same being diagrammatically shown in Figure 2 of the drawing and being designated by the numeral 14.

By right eye base out, it is understood that the prescription calls for a prism with its base or thickest portion on a horizontal meridian, to the right of a line running through the center of the lens blank. Had the prescription stated base up or base down, it would have specified a prism whose base or thickest portion was on a vertical meridian either above or below the center line of the lens. If, therefore, my prism is to be base out on a lens for the right eye, point 14 must be located on the horizontal meridian 13 to the right of the meridian 12, and its decentration must be determined by the rule that a lens of 1D decentered 1 centimeter gives a prism of one prism diopter. I compute the amount of this decentration, therefore, by solving the following simple equation: $7D \times Y = 8.75$.

In the equation, 7D represents the power of lens in diopters, Y is the unknown quantity, which represents the amount of decentration necessary in centimeters required to produce the desired prism, and the 8.75 is the number of prism diopters. Solving then for Y which is to give me the amount of decentration in centimeters, I obtain 1.25 and thus locate the point 14 a distance of 1.25 centimeters from the optical center of my blank.

If now, I compute by trigonometric calculation, the power of this point in the secondary plane 15 and the primary plane 16, I shall find that in the plane 15 I would have, instead of the power +7D, which represents the actual power which I desire, the power +7.16D, or an excess power of plus .16D. In the primary plane designated by 16, I would find a power of +7.49D or an increase in power in this plane over the original +7D which I desired of +.49D.

Figure 4:
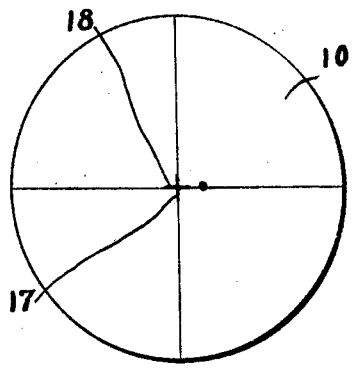
Figure 4 is a similar view showing the fourth step of my process.

In order then to correct this error, I add to the central power of my lens blank the inverse of these errors. Referring now to Figure 4 of the drawing and considering that I have added the inverse of these errors to the original powers of the meridians 12 and 13 at point 11, I find that I shall require in the vertical meridian 17, a power of plus 6.84D and in the horizontal meridian, designated by the numeral 18, a power of +6.51D, in that I have added to the vertical meridian −0.16D to decrease the power in the secondary plane at the point 14, and have added −0.49D to the horizontal meridian to decrease the power in the primary plane at the point 14.

From the foregoing computation, it is to be seen that in place of the original +10.67D spherical curve which I ordinarily would have placed on the front surface of my blank to give me a lens of +7D sphere, I must substitute for this surface, a toric surface of the curve +10.18 sphere combined with +0.33 cylinder axis 180 degrees. By grinding this toric surface on the front surface of my lens blank, I obtain at a point 1.25 c. m. to the left of the optical axis, an increase in strength of 0.49D in the horizontal direction and 0.16D in the vertical direction. It is obvious, therefore, that this point will measure +7.00D sphere as required.

Having thus determined the surface which I must place on the front of my lens blank in order to give me the ultimate power desired at the geometrical center of my finished lens, I proceed to grind the same as represented in Figure 5, to the corrected power, subsequently cutting from the blank, as clearly shown in Figure 6, a completed lens having the point 14 as its geometrical center.

In practical use, I have found that with my invention, I can regulate the error in the power at the geometrical center of my prismatic lens to an amount less by far than the difference in power between neighboring lenses in the range series which is a practical standard to use as it brings the error within limits that may easily be accepted. If my error of prism diopter does not originally exceed this difference between the neighboring lenses in the series, I prefer not to correct the same, applying my process only when this error exceeds this difference at which time I am able by my process to so reduce the same as to make it practically negligible.

In referring to the range series, I mean the series of different powers of lenses usually ground or carried by all lens manufacturers. As illustrating a series or range of commercial ophthalmic lenses, the following schedule taken from the price list of one of the largest lens manufactures is set out: spherical, 0.12, 0.25, 0.37, 0.50, 0.62, 0.75, 1.00, 1.25, 1.50, 1.75, 2.00, 2.25, 2.50, 2.75, 3.00, 3.25, - - - - 20.00.

Cylinders and torics, 0.12, 0.25, 0.37, 0.50, 0.62, 0.75, 087, 1.00, 1.12, 1.25, 1.37, 1.50, 1.62, 1.75, 2.00, 2.25, - - - - 6.50, 7.00, 7.50, 8.00.

In the spherical range, it will be seen that the lenses increase from 0.12 to $0.75 \times \frac{1}{8}D$ steps, while as the lenses increase in power the steps between the lenses increase, in reality, up to steps of 2 diopters.

In the cylinder or toric range the steps vary from $\frac{1}{8}D$ to 2D similarly. I find that in producing prismatic lenses by decentration, it is hardly practical to attempt to decenter a lens whose power is very low and that, therefore, I need only make sure that my correction is within $\frac{1}{4}D$ of the desired power, or an amount which represents the size of the steps in the range of average power lenses.

From the foregoing description it will be seen that I have provided a process by which prismatic ophthalmic lenses may be produced through the grinding of a lens blank and the decentration of the same. I have overcome the previous undesirability of this process in that I have provided means for correcting the error usually incident to lenses produced in this way. Should I care to stop my process at a point represented by Figure 5 in the drawing, it will be seen that I will have produced a lens blank which has been ground to a power from which may be cut a substantially correct prismatic lens, and I, therefore, reserve the right to include such lens blanks within the spirit of my invention.

While I have shown and described specific examples and details of my invention, it is to be understood that I do not desire to limit myself particularly thereto, in that I reserve the right to make certain departures in so far as I remain within the spirit of my invention and the scope of the appended claims.

Having thus described my invention, I claim:

1. The process of correcting for spherical and astigmatic error in a prismatic lens produced by decentration, which consists in varying the axial power of the lens blank from which the lens is to be cut to correct the power of the geometrical center of the finished lens.

2. The process of correcting for spherical and astigmatic error in a prismatic lens produced by decentration, which consists in adding an error to the axial power of the lens blank from which the finished lens is to be cut of a magnitude to correct the inherent error in the geometrical center of the finished lens.

3. The process of correcting for spherical and astigmatic error in a prismatic lens produced by decentration, which consists in adding to the axial power of the blank from which the finished lens is to be cut the inverse of the marginal variation from axial power of a point in the lens blank coincident with the geometrical center of the finished lens.

4. The process of producing a lens blank for an ophthalmic prismatic lens corrected for spherical and astigmatic error and produced by decentration which consists in forming a blank with a power at its optical center corrected by the inverse of the amount of variation in power from this center, of a marginal point adapted to be the geometrical center of the completed lens.

5. The process of producing an ophthalmic lens of any given power, having a prism of any given power produced by decentration and corrected for spherical and astigmatic error which consists in locating the optical center of a lens blank, locating the point on the lens blank which is to be the geometrical center of the prismatic lens, computing in two meridians the variation of this point from the power at the optical center of the lens blank, adding the inverse of this variation to the original power at the optical center of the lens blank, grinding the blank to the corrected power at its optical center, and cutting the prismatic lens with the corrected point as its geometrical center.

6. An ophthalmic lens having the axial power exceeding the original calculated axial power by an amount equal to the inverse of the variation in power at the geometrical center of the lens in two meridians from the original calculated axial power of the lens.

7. An ophthalmic lens having the axial power exceeding the original calculated axial power by an amount equal to the inverse of the variation in power at the geometrical center of the lens from the original calculated axial power of the lens.

ANNA ESTELLE GLANCY.